(12) United States Patent
Pedrosa et al.

(10) Patent No.: US 12,720,018 B2
(45) Date of Patent: Aug. 25, 2026

(54) AUTONOMOUS MONITORING BY UNMANNED AERIAL VEHICLE SYSTEMS AND METHODS

(71) Applicant: FLIR Unmanned Aerial Systems ULC, Vancouver (CA)

(72) Inventors: Marco P. Pedrosa, Waterloo (CA); Spencer Quin, Kitchener (CA); Richard Cunha, Toronto (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 146 days.

(21) Appl. No.: 18/634,216

(22) Filed: Apr. 12, 2024

(65) Prior Publication Data

US 2024/0348751 A1 Oct. 17, 2024

Related U.S. Application Data

(60) Provisional application No. 63/496,341, filed on Apr. 14, 2023.

(51) Int. Cl.
*H04N 7/18* (2006.01)
*G06V 20/17* (2022.01)
(Continued)

(52) U.S. Cl.
CPC ............. *H04N 7/185* (2013.01); *G06V 20/17* (2022.01); *G06V 20/52* (2022.01); *H04N 23/61* (2023.01);
(Continued)

(58) Field of Classification Search
CPC ........ H04N 7/185; H04N 23/61; H04N 23/64; H04N 23/695; H04N 23/69; G06V 20/17; G06V 20/52
(Continued)

(56) References Cited

U.S. PATENT DOCUMENTS 8,718,838 B2 5/2014 Kokkeby et al.
10,890,927 B2 1/2021 Miller
(Continued)

FOREIGN PATENT DOCUMENTS

JP 2017509520 * 4/2017
KR 101961800 * 3/2019
(Continued)

OTHER PUBLICATIONS

Yong, S.-P. et al. "Motion Detection Using Drone's Vision," *2017 Asia Modelling Symposium* (*AMS*), Kota Kinabalu, Malaysia, 2017, pp. 108-112, doi: 10.1109/AMS.2017.25.

*Primary Examiner* — Muhammad Shafi
(74) *Attorney, Agent, or Firm* — Haynes and Boone, LLP

(57) ABSTRACT

Systems and methods directed to autonomous monitoring by an unmanned aerial vehicle (UAV) are provided. A system may include a UAV including a camera configured to capture a stream of images of a scene. The system further includes one or more logic devices configured to control an automatic flight of the UAV to capture the stream of images based on a flight mode selected by a user. The one or more logic devices are further configured to detect a monitoring event in the stream of images. The one or more logic devices are further configured to provide a notification to the user based on the detected monitoring event. The UAV may include at least one of the logic devices. Additional systems and related methods are also provided.

20 Claims, 8 Drawing Sheets

(51) Int. Cl.

| | |
|---|---|
| ***G06V 20/52*** | (2022.01) |
| ***H04N 23/60*** | (2023.01) |
| ***H04N 23/61*** | (2023.01) |
| ***H04N 23/695*** | (2023.01) |
| *H04N 23/69* | (2023.01) |

(52) U.S. Cl.
CPC ........... *H04N 23/64* (2023.01); *H04N 23/695* (2023.01); *H04N 23/69* (2023.01)

(58) Field of Classification Search
USPC ............................................................ 701/26
See application file for complete search history.

(56) References Cited

U.S. PATENT DOCUMENTS

| | | | | |
|---|---|---|---|---|
| 2016/0107749 | A1 | 4/2016 | Mucci | |
| 2019/0047701 | A1 * | 2/2019 | Winkle | H02J 7/342 |

FOREIGN PATENT DOCUMENTS

| | | | |
|---|---|---|---|
| WO | WO 2016/059213 A1 | | 4/2016 |
| WO | WO-2020006871 | * | 1/2020 |
| WO | WO-2022094808 | * | 5/2022 |

* cited by examiner

AUTONOMOUS MONITORING BY UNMANNED AERIAL VEHICLE SYSTEMS AND METHODS

CROSS REFERENCE TO RELATED APPLICATIONS

This application claims priority to and the benefit of U.S. Provisional Patent Application No. 63/496,341 filed Apr. 14, 2023 entitled "AUTONOMOUS MONITORING BY UNMANNED AERIAL VEHICLE SYSTEMS AND METHODS," which is incorporated herein by reference in its entirety.

TECHNICAL FIELD

One or more embodiments relate generally to unmanned aerial vehicles (UAVs) and more particularly, for example, to monitoring operations performed with a UAV.

BACKGROUND

Various personnel (e.g., military and public safety professionals) often need to perform various monitoring tasks, such as keeping track of vehicles, people, and other objects entering a location they may be safeguarding. With the help of an unmanned aerial vehicle (UAV), this can be an easier task. However, conventional systems typically require personnel to manually pilot the UAV to have eyes on the various regions of interest and manually monitor the video feed.

SUMMARY

In one or more embodiments, a system is provided. The system includes an unmanned aerial vehicle (UAV) including a camera configured to capture a stream of images of a scene. The system further includes one or more logic devices configured to control an automatic flight of the UAV to capture the stream of images based on a flight mode selected by a user. The one or more logic devices are further configured to detect a monitoring event in the stream of images. The one or more logic devices are further configured to provide a notification to the user based on the detected monitoring event. The UAV may include at least one of the logic devices.

In one or more embodiments, a method is provided. The method includes capturing, using a camera of a UAV, a stream of images of a scene. The method further includes controlling, by one or more logic devices, an automatic flight of the UAV to capture the stream of images based on an automatic flight mode selected by a user. The method further includes providing, by the one or more logic devices, a notification to the user based on the detected monitoring event. The UAV may include at least one of the logic devices.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
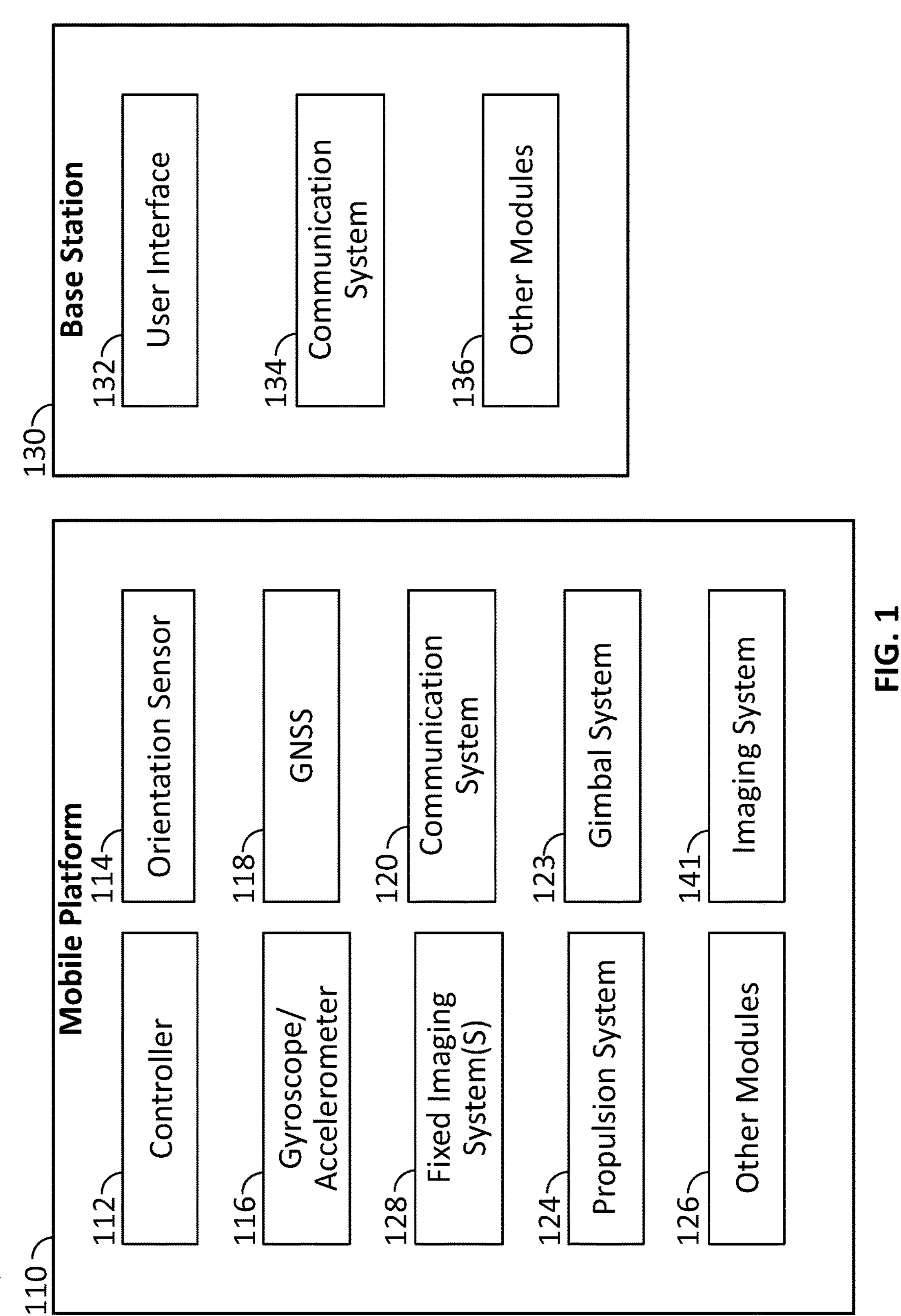
FIG. 1 illustrates a block diagram of a system, in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Systems and methods are provided for autonomous monitoring by an unmanned aerial vehicle (UAV). According to various embodiments of the disclosure, one or more areas centered around a specific location may be scanned by a UAV (e.g., for security purposes) in an automated way such that operators can be notified (e.g., in real-time or near real-time) of detected objects. Additionally, or alternatively, the detected objects can be reviewed later.

FIG. 1 illustrates a block diagram of a system 100, in accordance with an embodiment of the disclosure. Referring to FIG. 1, system 100 includes a UAV 110 and a base station 130, in accordance with one or more embodiments of the disclosure. UAV 110 may be any pilotless aircraft, such as an airplane, helicopter, drone, or other machine capable of flight (e.g., a mobile platform). For example, UAV 110, which may be referred to as a drone or an unmanned aerial system (UAS), may be any pilotless aircraft for military missions, public services, agricultural application, and recreational video and photo capturing, without intent to limit. Depending on the application, UAV 110 may by piloted autonomously (e.g., via onboard computers) or via remote control. UAV 110 may include a fixed-wing, rotorcraft, or quadcopter design, although other configurations are contemplated. As a result, the term "UAV" or "drone" is characterized by function and not by shape or flight technology.

In various embodiments, UAV 110 may be configured to fly over a scene or survey area, to fly through a structure, or to approach a target and image or sense the scene, structure, or target, or portions thereof, via an imaging system 141 (e.g., using a gimbal system 123 to aim imaging system 141 at the scene, structure, or target, or portions thereof, for example). Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 110 and/or imaging system 141, such as controlling gimbal system 123 to aim imaging system 141 towards a particular direction, or controlling propulsion system 124 to move UAV 110 to a desired position in a scene or structure or relative to a target.

UAV 110 may be implemented as a mobile platform configured to move or fly and position and/or aim imaging system 141 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 123, a propulsion system 124, and other modules 126. Operation of UAV 110 may be substantially autonomous and/or partially or completely controlled by base station 130, which may include one or more of a user interface 132, a communication system 134, and other modules 136. In other embodiments, UAV 110 may include one or more of the elements of base station 130, such as with various types of manned aircraft, terrestrial vehicles, and/or surface or subsurface watercraft. Imaging system 141 may be physically coupled to UAV 110 via gimbal system 123 and may be configured to capture sensor data (e.g., visible spectrum images, infrared images, narrow aperture radar data, and/or other sensor data) of a target position, area, and/or object(s) as selected and/or framed by operation of UAV 110 and/or base station 130.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of system 100, such as gimbal system 123, imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of UAV 110 such as gimbal system 123, imaging system 141, and fixed imaging system(s) 128, for example.

In some embodiments, controller 112 may be configured to substantially continuously monitor and/or store the status of and/or sensor data provided by one or more elements of UAV 110, gimbal system 123, imaging system 141, fixed imaging system(s) 128, and/or base station 130, such as the position and/or orientation of UAV 110, gimbal system 123, imaging system 141, and/or base station 130, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 123, fixed imaging system(s) 128, and/or other elements of system 100, and providing such measurements as sensor signals and/or data that may be communicated to various devices of system 100.

Gyroscope/accelerometer 116 may be implemented as one or more inertial measurement units (IMUs), electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from fixed imaging system(s) 128 and/or imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal system 123 may be implemented as an actuated gimbal mount, for example, that may be controlled by controller 112 to stabilize and direct imaging system 141 relative to a target or to aim imaging system 141 according to a desired direction and/or relative orientation or position. For example, controller 112 may receive a control signal from one or more components of system 100 to cause gimbal system 123 to adjust a position of imaging system 141 as described in the disclosure. As such, gimbal system 123 may be configured to provide a relative orientation of imaging system 141 (e.g., relative to an orientation of UAV 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/imaging system 141. In further embodiments, gimbal system 123 may be configured to couple to a laser pointer, range finder, and/or other device, for example, to support, stabilize, power, and/or aim multiple devices (e.g., imaging system 141 and one or more other devices) substantially simultaneously.

In some embodiments, gimbal system 123 may be adapted to rotate imaging system 141+−90 degrees, or up to 360 degrees, in a vertical plane relative to an orientation and/or position of UAV 110. In further embodiments, gimbal system 123 may rotate imaging system 141 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 123 and/or imaging system 141 relative to UAV 110, for example, or an absolute or relative orientation of an element of imaging system 141 (e.g., a sensor of imaging system 141). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to UAV 110 and/or to steer UAV 110. In some embodiments, propulsion system 124 may include multiple propellers (e.g., a tri, quad, hex, oct, or other type "copter") that can be controlled (e.g., by controller 112) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of UAV 110 such that a position and orientation is fixed relative to the body of the mobile platform, according in various embodiments. Fixed imaging system(s) 128 may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the UAV 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying UAV 110 at speeds in excess of 10 m/s at 1 m distance from the surface (e.g., wall, ground, roof, etc.). When not sampling at high rates, these low-resolution fixed imaging system(s) 128 may consume little power and thus minimally impact an average power consumption for UAV 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of UAV 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). Other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station 130.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause UAV 110 to move according to the target heading, route, and/or orientation, or to aim imaging system 141. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., imaging system 141) associated with UAV 110, for example, and to generate control signals for adjusting an orientation and/or position of the actuated device according to the target altitude, orientation, and/or position. Such control signals may be transmitted to controller 112 (e.g., using communication system 134 and 120), which may then control UAV 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from UAV 110. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, UAV 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of UAV 110 and/or system 100 or to process sensor data to compensate for environmental conditions, such as an water content in the atmosphere approximately at the same altitude and/or within the same area as UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques between elements of system 100.

Figure 2A:
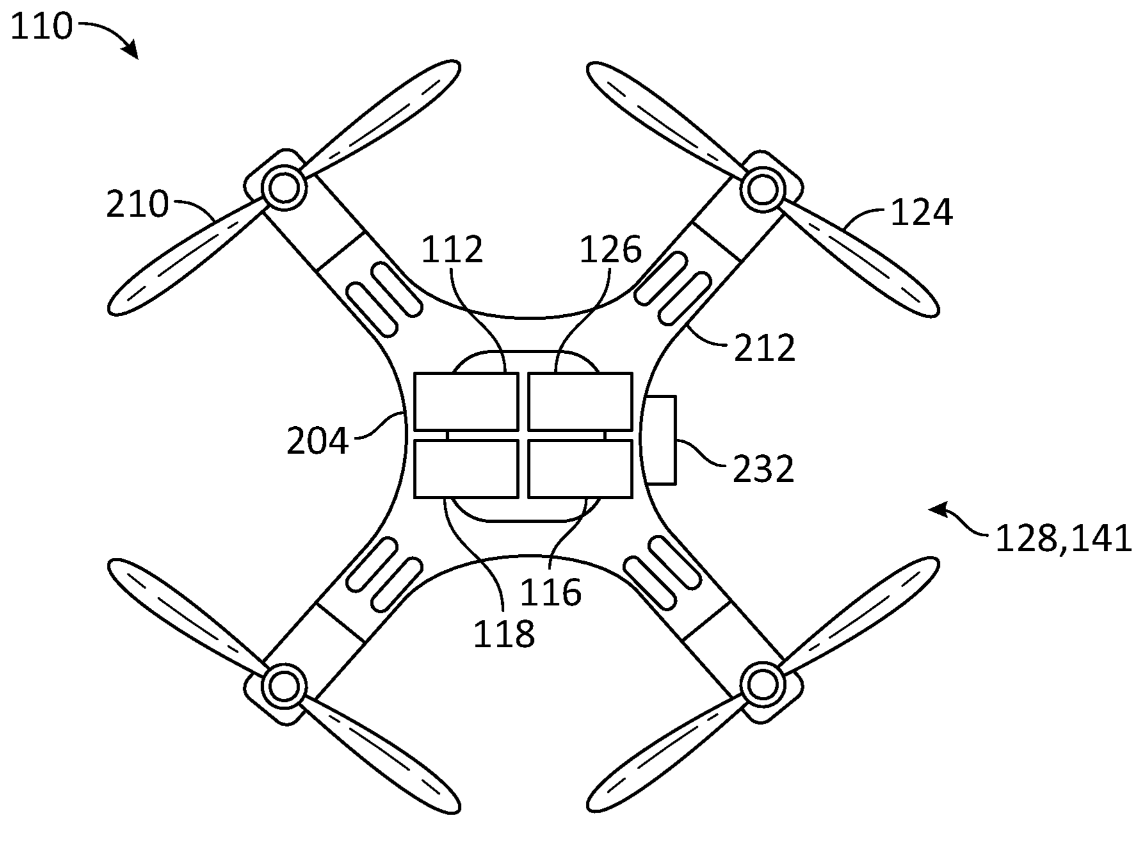
FIG. 2A illustrates a diagram of an unmanned aerial vehicle (UAV), in accordance with an embodiment of the disclosure.

FIG. 2A illustrates a diagram of UAV 110. Referring to FIG. 2A, UAV 110 may include a body 204 and propulsion system 124. Propulsion system 124 may be configured to propel UAV 110 for flight. For example, propulsion system 124 may include one or more propellers 210 connected to body 204, such as via respective arms or wings 212 extending from body 204. Depending on the application, propellers 210 may have a fixed orientation, or propellers 210 may move, to provide a desired flight characteristic. Operation of propulsion system 124 may be substantially autonomous and/or partially or completely controlled by a remote system (e.g., a remote control, a tablet, a smartphone, base station 130, etc.).

Body 204 may be equipped with controller 112 that may include one or more logic devices. Each logic device, which may be referred to as an on-board computer or processor, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 110).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of UAV 110. For example, controller 112 may be adapted to store sensor signals, sensor information, and/or operational parameters, over time, for example, and provide such stored data to a user. In some embodiments, controller 112 may be integrated with one or more other elements of UAV 110, for example, or distributed as multiple logic devices within UAV 110.

Controller 112 may be configured to perform a set of operations. For example, controller 112 may be configured for flight control and position estimation, among other operations. For position estimation, UAV 110 may be equipped with GNSS 118 and/or gyroscope/accelerometer 116 to provide position measurements. For example, GNSS 118 and/or gyroscope/accelerometer 116 may provide frequent measurements to controller 112 for position estimation. In embodiments, controller 112 may be configured for video/image processing and communication. Specifically, controller 112 may process one or more images captured by one or more cameras of UAV 110, as described below. Although specific flight module and imagery module capabilities are described with reference to controller 112, respectively, the flight module and imagery module may be embodied as separate modules of a single logic device or performed collectively on multiple logic devices.

In embodiments, UAV 110 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 110, as described herein. In various embodiments, other modules may include a power supply implemented as any power storage device configured to provide enough power to each element of UAV 110 to keep all such elements active and operable.

Figure 2B:
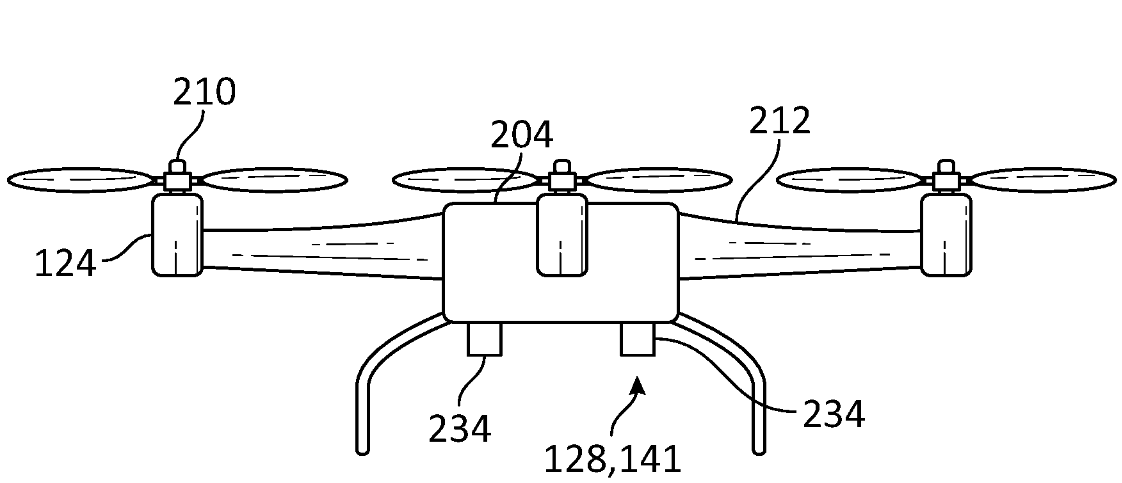
FIG. 2B illustrates another diagram of the UAV, in accordance with an embodiment of the disclosure.

FIG. 2B illustrates a diagram of a side view of UAV 110, in accordance with an embodiment of the disclosure. Referring to FIGS. 2A-2B, UAV 110 may include one or more cameras, such as several cameras (e.g., pointing in same or different directions). For example, fixed imaging system(s) 128 and/or imaging system 141 may include a front camera 232 pointing in the direction of travel. In embodiments, front camera 232 may be fixed or connected to gimbal system 123 to aim front camera 232 as desired. Referring to FIG. 2B, fixed imaging system(s) 128 and/or imaging system 141 may include one or more navigation cameras 234 pointing down and to the sides of body 204. Navigation cameras 234 may be fixed or connected to gimbal system 123 to aim navigation cameras 234 as desired. Navigation cameras 234 may support position estimation of UAV 110, such as when GPS data is inaccurate, GNSS 118 is inoperable or not functioning properly, etc. For example, images from navigation cameras 234 (and/or front camera 232) may be provided to controller 112 for analysis (e.g., position estimation).

Front camera 232 and/or navigation cameras 234 may be configured to capture one or more images (e.g., visible and/or non-visible images), such as a stream of images. For example, front camera 232 and/or navigation cameras 234 may be configured to capture visible, infrared, and/or thermal infrared images, among others. Each camera may include an array of sensors (e.g., a multi-sensor suite) for capturing thermal images (e.g., thermal image frames) in response to infrared radiation. In embodiments, front camera 232 and/or navigation cameras 234 may capture short-wave infrared (SWIR) light (e.g., 1-2 μm wavelengths), mid-wave infrared (MWIR) light (e.g., 3-5 μm wavelengths), and/or long-wave infrared (LWIR) light (e.g., 8-15 μm wavelengths). In embodiments, front camera 232 and/or navigation cameras 234 may capture visible and infrared fused images. For instance, both a visible and a thermal representation of a scene (e.g., a search area) may be captured and/or presented to the pilot or another user of the system.

Figure 3:
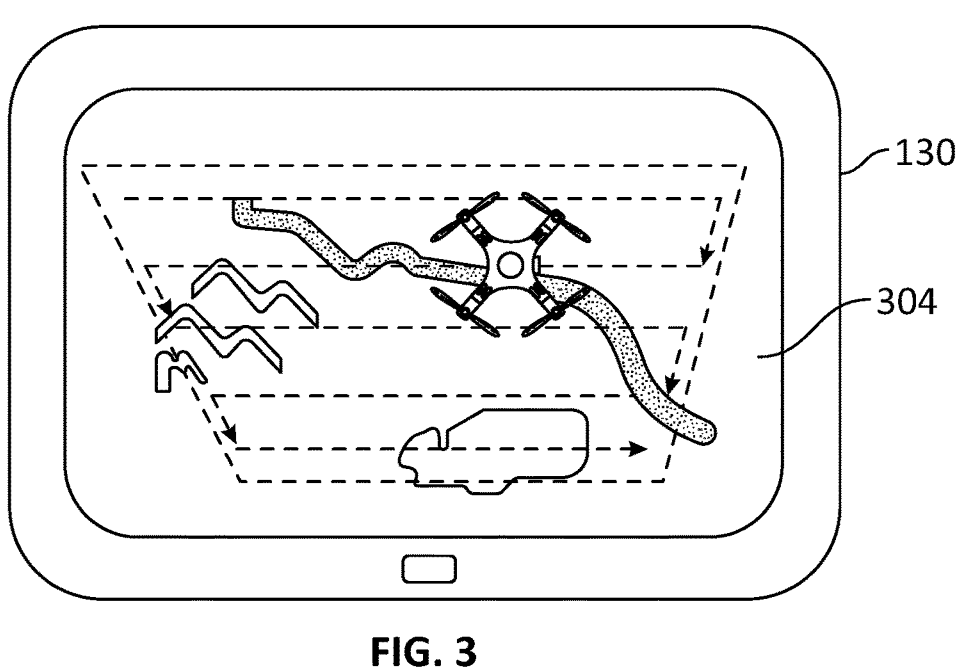
FIG. 3 illustrates a diagram of a base station or controller, in accordance with an embodiment of the disclosure.

FIG. 3 illustrates a diagram of base station 130, in accordance with an embodiment of the disclosure. Base station 130 may be implemented as one or more of a tablet, a display, a touch screen, a keyboard, a mouse, a joystick, a knob, a steering wheel, and/or any other device capable of accepting user input and/or providing feedback to a user. In various embodiments, base station 130 may provide a user interface 304 (e.g., a graphical user interface) adapted to receive user input. Base station 130 may be implemented with one or more logic devices that may be adapted to store and/or execute instructions, such as software instructions, implementing any of the various processes and/or methods described herein. For example, base station 130 may be adapted to form communication links, transmit and/or receive communications (e.g., sensor signals, control signals, sensor information, user input, and/or other information), for example, or to perform various other processes and/or methods described herein The pilot may have control of UAV 110 and access to UAV data using base station 130. For example, base station 130 may be connected to UAV 110 using a wireless link, such as a wireless link having enough bandwidth for video and data transmission. Base station 130 may include an image panel and an input panel. In embodiments, user interface 304 may function as both the image panel and the input panel. The image panel may be used to view image/video feeds from one or more cameras on-board UAV 110, such as front camera 232 and/or navigation cameras 234. The input panel may be configured to receive user input, such as via the user's finger, a stylus, etc. For example, input panel may allow the pilot to configure different UAV and/or search settings. In embodiments, base station 130 may provide a map for the pilot to locate UAV 110 during flight. In some embodiments, one or more accessories may be connected to the base station 130, such as a joystick for better flight control of UAV 110. As shown, the base station 130 may be a tablet, although other configurations are contemplated.

Figure 4:
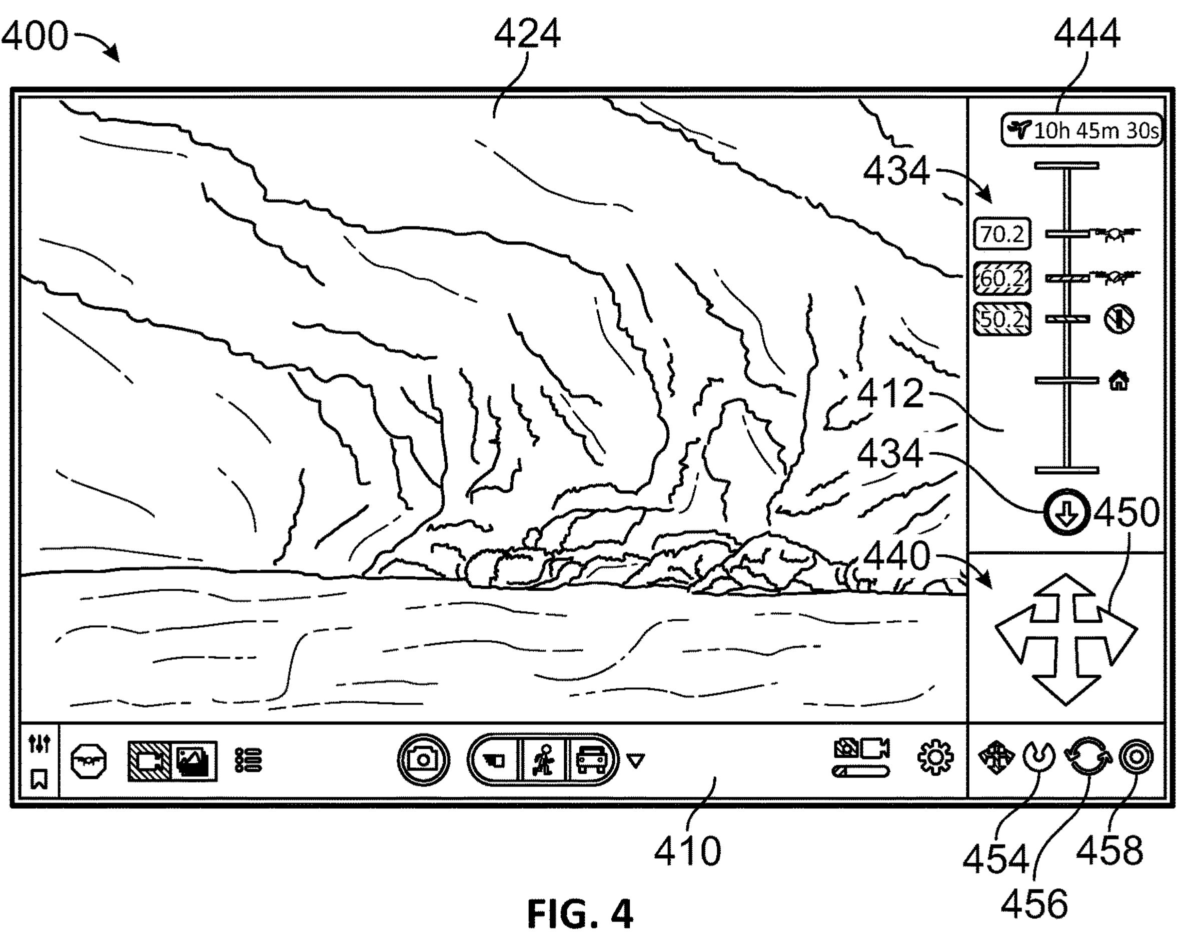
FIG. 4 illustrates a diagram of a user interface associated with flight of a UAV, in accordance with an embodiment of the disclosure.

FIG. 4 illustrates a diagram of a user interface 400 associated with flight of UAV 110, in accordance with an embodiment of the disclosure. As described herein, user interface 400 may be similar to user interface 304 of base station 130, described above, and vice versa. For example, user interface may be adapted to receive user input (e.g., from a pilot) to control UAV 110. For example, the user or pilot may select or adjust one or more flight, monitoring, and/or surveillance parameters of UAV 110 via user interface 400, as described below. In embodiments, selection of one or more parameters via user interface 400 may provide corresponding command signals to UAV 110, such as via a logic device (e.g., controller 112). In embodiments, user interface 400 may be provided in a full screen mode, although other configurations are contemplated.

Referring to FIG. 4, user interface 400 may include a display window and at least one adjacent sidebar (e.g., a first sidebar 410 and a second sidebar 412) including multiple controls. As shown, first sidebar 410 is located along the bottom of display window, and second sidebar 412 is located along a right side of display window. Such configurations are illustrative only and other configurations are contemplated, including a single sidebar along one side of display window, more than two sidebars, etc. Display window may present a stream of images of a scene 424 captured by a camera of UAV 110 (e.g., captured by imaging system 128 and/or imaging system 141). First sidebar 410 may present one or more controls associated with monitoring and/or detection of one or more objects in scene 424. Second sidebar 412 may present one or more controls associated with UAV flight.

For example, second sidebar 412 may include an altitude control 432, a takeoff/landing control 434, and a flight control window 440, or any combination thereof. In embodiments, second sidebar 412 may include other features associated with flight of UAV 110, including a flight time summary 444, for instance. The pilot to set the hover altitude of UAV 110 using altitude control 432. In embodiments, altitude control 432 may identify preset hover altitudes for quick selection. Additionally, or alternatively, altitude control 432 may identify altitude ceilings and minimums. Using takeoff/landing control 434, the pilot to initiate an automatic takeoff and/or landing of UAV 110. Using flight control window 440, the pilot may control movement/flight of UAV 110. For instance, the pilot may move UAV 110 forward, back, left, or right using a lateral motion control 450.

In addition to lateral motion control 450, flight control window 440 may include at least one automatic flight mode selectable by the pilot. For instance, the pilot may select between multiple (e.g., first, second, and third) automatic flight modes of UAV 110 by pressing respective buttons (e.g., first, second, and third mode buttons 454, 456, 458) in flight control window 440. As described more fully below, selection of first, second, and third mode buttons 454, 456, 458 may specify different ways in which UAV 110 will automatically scan the surrounding area. If one mode is active and the pilot or user selects a different mode, the current mode may be stopped. The automatic flight modes of UAV 110 may automate actions typically performed manually by the pilot or user. For instance, the automatic flight modes may automate monitoring of scene 424 (e.g., detection and media capture) and error handling, among other actions of UAV 110, with little to no input from the pilot or user once set.

Figures 5, 6:
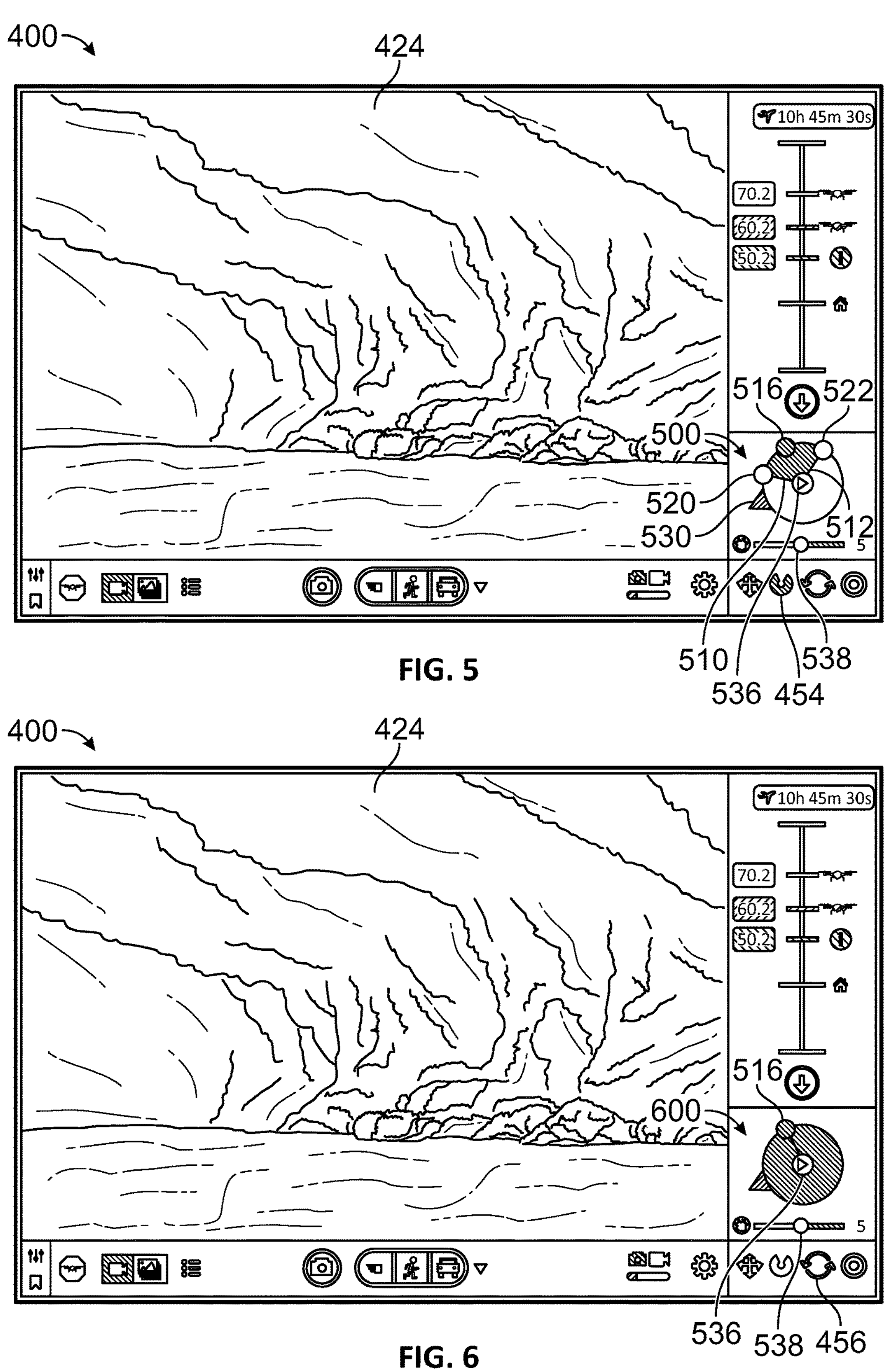
FIG. 5 illustrates a diagram of first user controls associated with a first automatic flight mode of a UAV, in accordance with an embodiment of the disclosure.
FIG. 6 illustrates a diagram of second user controls associated with a second automatic flight mode of a UAV, in accordance with an embodiment of the disclosure.

FIG. 5 illustrates a diagram of first user controls 500 associated with a first automatic flight mode of UAV 110, in accordance with an embodiment of the disclosure. For example, the first automatic flight mode may include automatically scanning scene 424 between two bounds. When this automatic flight mode is desired, pilot selection of first mode button 454 may present first user controls 500 in flight control window 440. First user controls 500 may present a circle with two bounds (e.g., a first bound 510 and a second bound 512) on either side of where UAV 110 is pointing. As shown, a center dot 516 may be provided to represent where UAV 110 is pointing (e.g., a current yaw of UAV 110). In addition, a first dot 520 and a second dot 522 may represent the bounds on either side. First bound 510 may represent a first orientation angle of UAV 110 relative to scene 424, and second bound 512 may represent a second orientation angle of UAV 110 relative to scene 424. In embodiments, the orientation of first user controls 500 may mimic the way that the compass rose has been oriented. For example, first user controls 500 may include an arrow 530 pointing north and lining up with compass rose north.

In embodiments, the pilot may adjust first user controls 500 to define a desired scan area. For instance, the pilot can drag first dot 520 to change first bound 510, and/or drag second dot 522 to change second bound 512. In embodiments, the pilot can click a bound to set the current yaw of UAV 110 as the bound value. In such embodiments, a popover may be presented in user interface 400 asking "Use the current yaw for this bound?" and an ok/cancel button. In embodiments, the pilot can drag center dot 516 to change the current yaw of UAV 110 directly. In such embodiments, the defined bounds may be updated to maintain the same relative positioning. The center of first user controls 500 may include a play/pause button 536, which would start the scanning of UAV 110 between first bound 510 and second bound 512. Once the scanning has started, play/pause button 536 may turn into a pause button and center dot 516 may start bouncing between first bound 510 and second bound 512 with corresponding movement of UAV 110. In embodiments, a slider 538 may be presented for setting the scanning speed (e.g., in degrees/second) of UAV 110 between first bound 510 and second bound 512.

FIG. 6 illustrates a diagram of second user controls 600 associated with a second automatic flight mode of UAV 110, in accordance with an embodiment of the disclosure. For example, the second automatic flight mode may include automatically scanning scene 424 in a circle. When this automatic flight mode is desired, pilot selection of second mode button 456 may present second user controls 600 in flight control window 440. Except as otherwise detailed below, second user controls 600 may be similar to first user controls 500, described above. As shown, second user controls 600 may simply show center dot 516 (indicating where UAV 110 is in its current yaw), play/pause button 536, and slider 538, among other similar features. Similar to first user controls 500, center dot 516 may be dragged by pilot in user interface 400 to manually adjust the current yaw of UAV 110. Initial selection of play/pause button 536 may start the scanning of UAV 110 in a circle. Once the scanning has started, play/pause button 536 may turn into a pause button (e.g., to pause scanning) and center dot 516 may rotate around the graphic with corresponding movement of UAV 110. Slider 538 may adjust the scanning speed (e.g., in degrees/second) of UAV 110.

In embodiments, the system may account for tethered or non-tethered flight of UAV 110. For example, for non-tethered flight, UAV 110 may keep rotating indefinitely. For tethered flight, however, the system may detect that the tether needs to be unwound. In such embodiments, UAV 110 may automatically start rotating in the opposite direction to unwind the tether. To switch the scan direction, the pilot can tap on second user controls 600, such as within the circle presented for second user controls 600.

Figure 7:
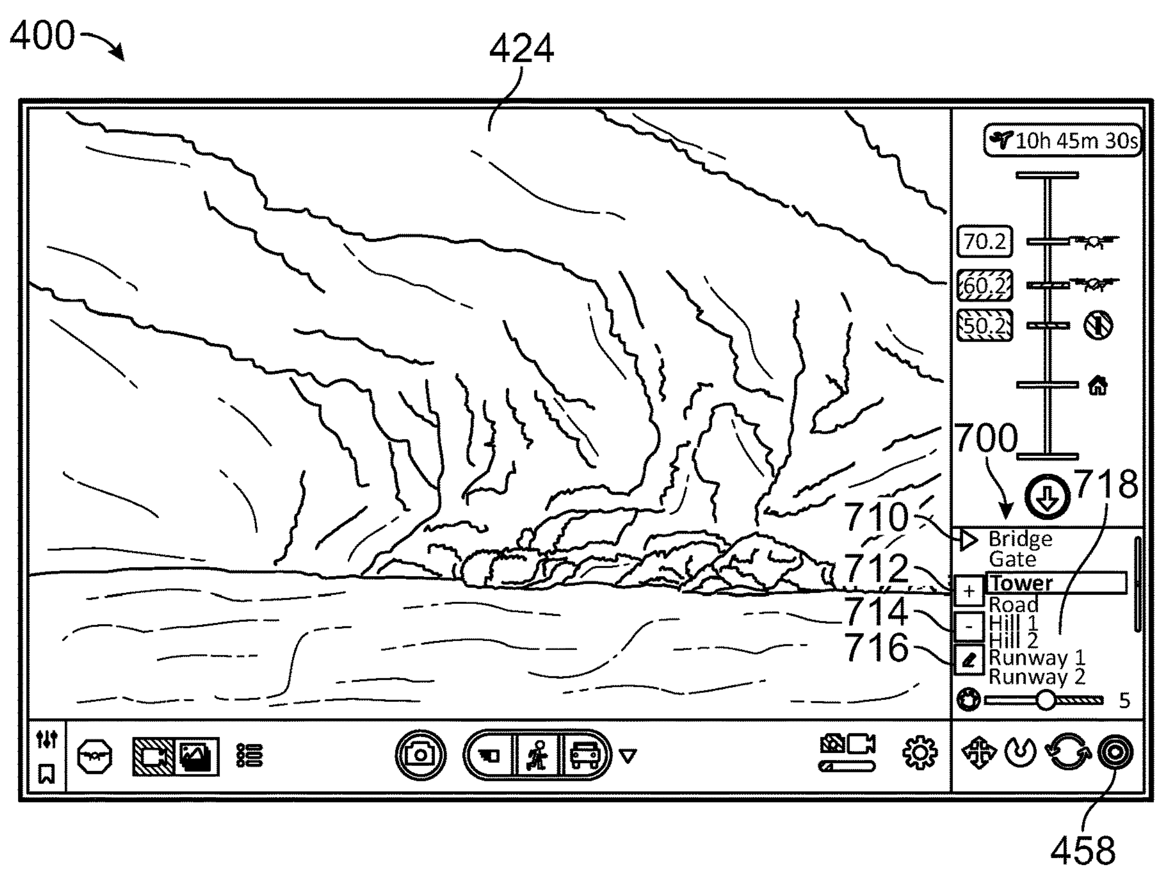
FIG. 7 illustrates a diagram of third user controls associated with a third automatic flight mode of a UAV, in accordance with an embodiment of the disclosure.

FIG. 7 illustrates a diagram of third user controls 700 associated with a third automatic flight mode of UAV 110, in accordance with an embodiment of the disclosure. For example, the third automatic flight mode may include automatically scanning one or more targets in scene 424. When this automatic flight mode is desired, pilot selection of third mode button 458 may present third user controls 700 in flight control window 440. As shown, third user controls 700 may include a play button 710, a plus button 712, a minus button 714, an update button 716, and a target list 718.

Selection of play button 710 may cause UAV 110 to scan the targets listed in target list 718, such as in order of creation. Once UAV 110 has finished scanning the targets in target list 718, UAV 110 may proceed in reverse order, or in any other order. As UAV 110 arrives at a certain target, the target may appear selected in target list 718. As UAV 110 leaves the target, the target may deselect from target list 718. In embodiments, user selection of a target in target list 718 may cause UAV 110 to scan the selected target.

Selection of plus button 712 may allow the pilot to add a new target, such as via a first dialog requesting a target name. Selection of minus button 714 may delete a selected target, such as via a second dialog confirming the deletion of the target. Selection of update button 716 may update one or more settings of a selected target, such as with an updated position and/or name, among other characteristics.

Figure 8:
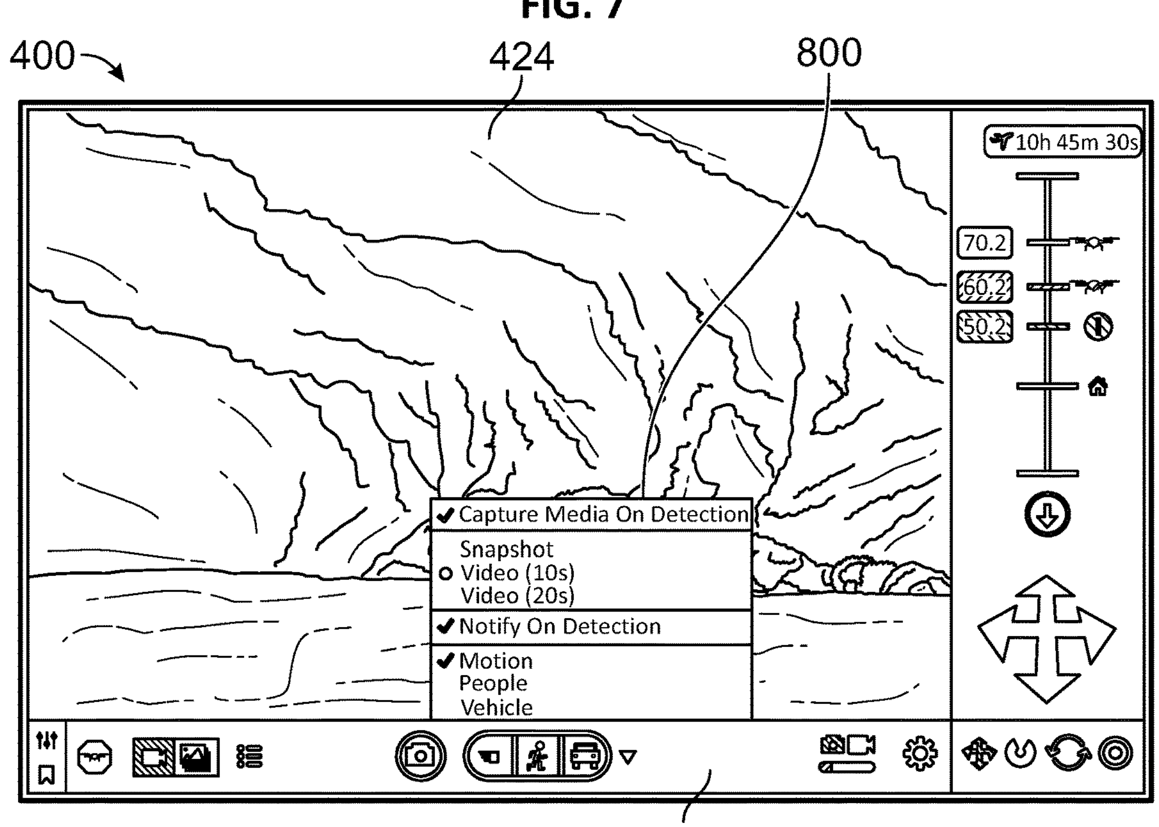
FIG. 8 illustrates a diagram of a monitoring event interface, in accordance with an embodiment of the disclosure.

FIG. 8 illustrates a diagram of a monitoring event interface 800, in accordance with an embodiment of the disclosure. Referring to FIG. 8, monitoring event interface 800 may be presented in or adjacent to first sidebar 410, such as in a popover when selected. Monitoring event interface 800 may allow the pilot to select a notification setting based on whether motion, people, or vehicles are detected in scene 424. For example, the pilot may select a first notification setting based on detected motion in scene 424, a second notification setting based on detected people in scene 424, and/or a third notification setting based on detected vehicles in scene 424. In embodiments, monitoring event interface 800 may allow user selection of which media is captured on detection (e.g., image snapshot, video capture, etc.) and whether notification is provided on detection of motion, people, and/or vehicles. Depending on the application, the notification may be a push notification, a dialog popover, a sound, and/or a rumble or other haptic feedback (e.g., on a joystick or other user controls), or any other notification to the user.

Figures 9, 10:
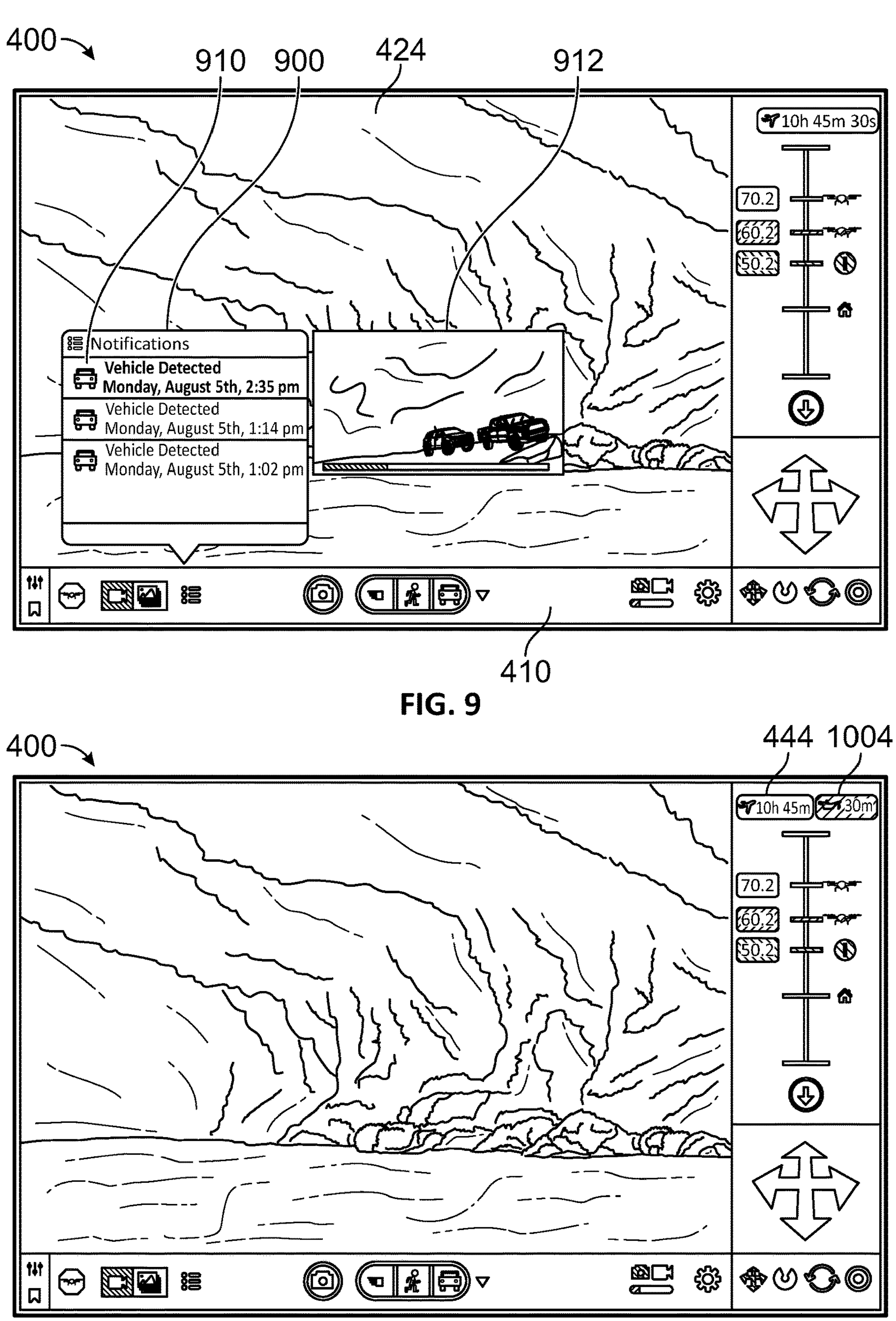
FIG. 9 illustrates a diagram of an event review interface, in accordance with an embodiment of the disclosure.
FIG. 10 illustrates a diagram of a maintenance condition detection and notification, in accordance with an embodiment of the disclosure.

FIG. 9 illustrates a diagram of an event review interface 900, in accordance with an embodiment of the disclosure. Referring to FIG. 9, event review interface 900 may be presented in or adjacent to first sidebar 410, such as in a popover when selected. Event review interface 900 may provide a notification list 910, including basic information about each notification or monitoring event (e.g., type of detection, date, time, location, etc.). If a notification is selected in the notification list 910, any associated captured media 912 may be displayed, such as adjacent the notification list 910. If the captured media 912 is a video, the video may be played in a loop (e.g., with a progress bar), although other configurations are contemplated. As shown, the captured media 912 may be presented in user interface 400 in addition to the current image of scene 424. In this manner, the pilot or user may review past monitoring events in user interface 400 while UAV 110 continues to scan scene 424 (e.g., without bringing UAV 110 down). Depending on the application, the captured media 912 may be recorded locally on UAV 110 or on an external device (e.g., base station 130, external hard drive, network, etc.).

FIG. 10 illustrates a diagram of a maintenance condition detection and notification, in accordance with an embodiment of the disclosure. Referring to FIG. 10, user interface 400 may include a maintenance minder 1004 to indicate when UAV 110 is recommended to receive maintenance. For example, if UAV 110 is recommended to receive maintenance within a certain time (e.g., within an hour, etc.) maintenance minder 1004 may be presented in user interface 400, such as next to flight time summary 444 as shown, with maintenance minder 1004 providing a count-down to maintenance. If time has expired, the time remaining may indicate "Now." If a certain time has elapsed since the maintenance deadline (e.g., greater than an hour), maintenance minder 1004 may change colors and/or flash. Maintenance minder 1004 may be reset when UAV 110 is landed. In some embodiments, the maintenance minder 1004 may be selected by the user or pilot to acknowledge the maintenance condition.

Figure 11:
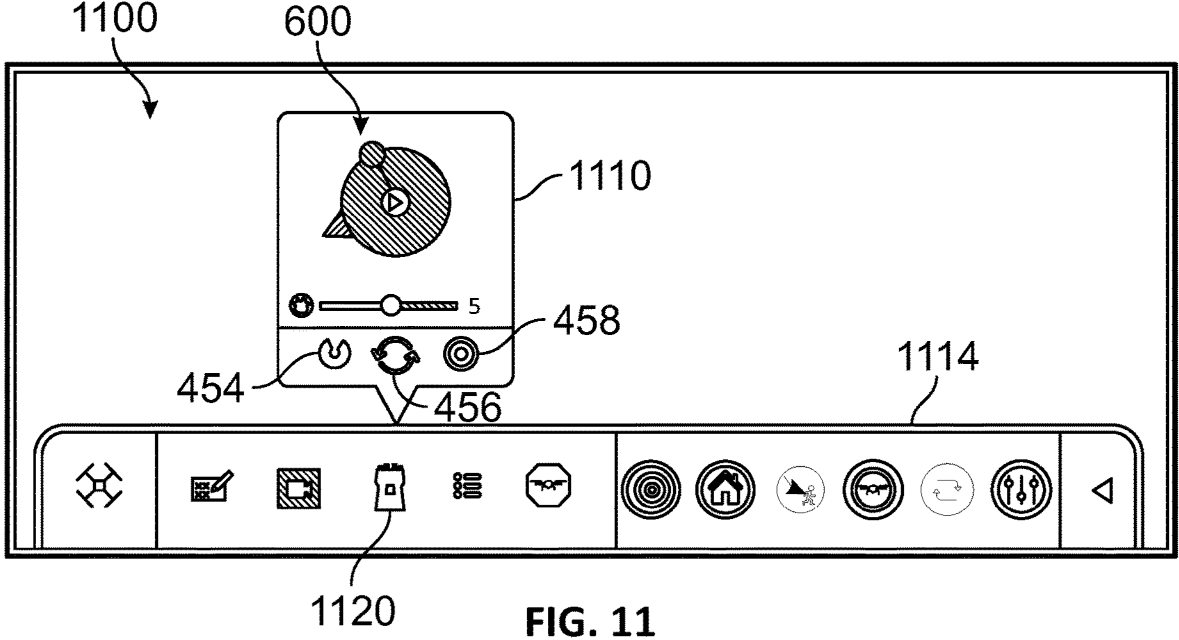
FIGS. 11-12 illustrate diagrams of an additional user interface to define a scanning behavior of a UAV, in accordance with an embodiment of the disclosure.
Figure 12:
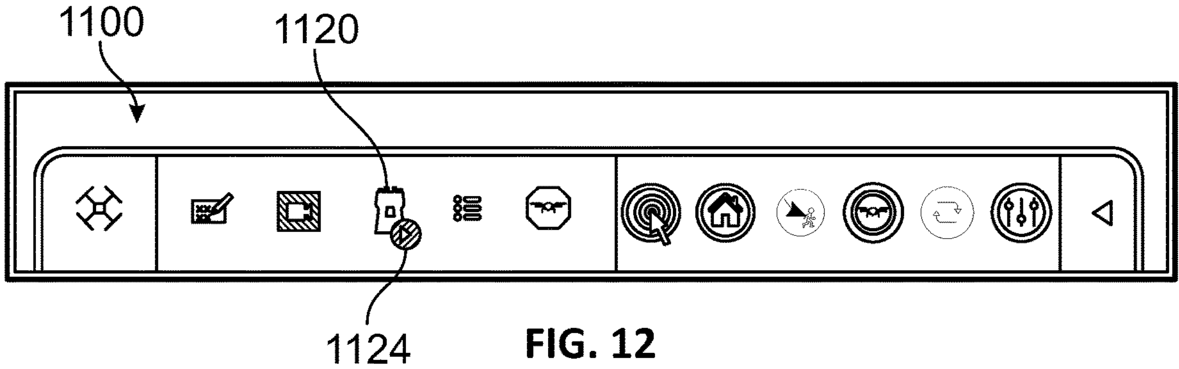

FIGS. 11-12 illustrate diagrams of an additional user interface 1100 to define a scanning behavior of UAV 110, in accordance with an embodiment of the disclosure. Except as otherwise noted below, user interface 1100 may be similar to user interface 400, described above. For example, user interface 1100 may include a flight control window 1110 similar to flight control window 440, described above. In embodiments, user interface 1100 may be provided to control scan behavior of UAV 110 from a map-centric UI orientation, although other configurations are contemplated.

Referring to FIG. 11, user interface 1100 may include a taskbar 1114, such as along the bottom of user interface 1100. Taskbar 1114 may include various icons associated with respective programs, applications, shortcuts, and the like (e.g., running on UAV 110 and/or base station 130, for instance). For example, taskbar 1114 may include a flight control icon 1120 to activate a scanning behavior of UAV 110. In such embodiments, flight control window 1110 may be presented in a popover when the pilot or user selects or clicks flight control icon 1120. As shown, flight control window 1110 may include first, second, and third mode buttons 454, 456, 458 that function as described above. For instance, selection of second mode button 456 may present second user controls 600 in flight control window 1110, as shown. In like manner, selection of first mode button 454 or third mode button 458 may present first user controls 500 or third user controls 700, respectively, in flight control window 1110. The pilot or user may then control or set the second automatic flight mode of UAV 110, in a similar manner as described above.

Referring to FIG. 12, selection of flight control icon 1120 may hide flight control window 1110 from view. If a scanning behavior of UAV 110 has been set previously, a play/pause button 1124 may be presented adjacent flight control icon 1120. In such embodiments, the user or pilot may select play/pause button 1124 to initiate or pause the scanning behavior. In this manner, play/pause button 1124 may function similar to play/pause button 536, described above.

Figure 13:
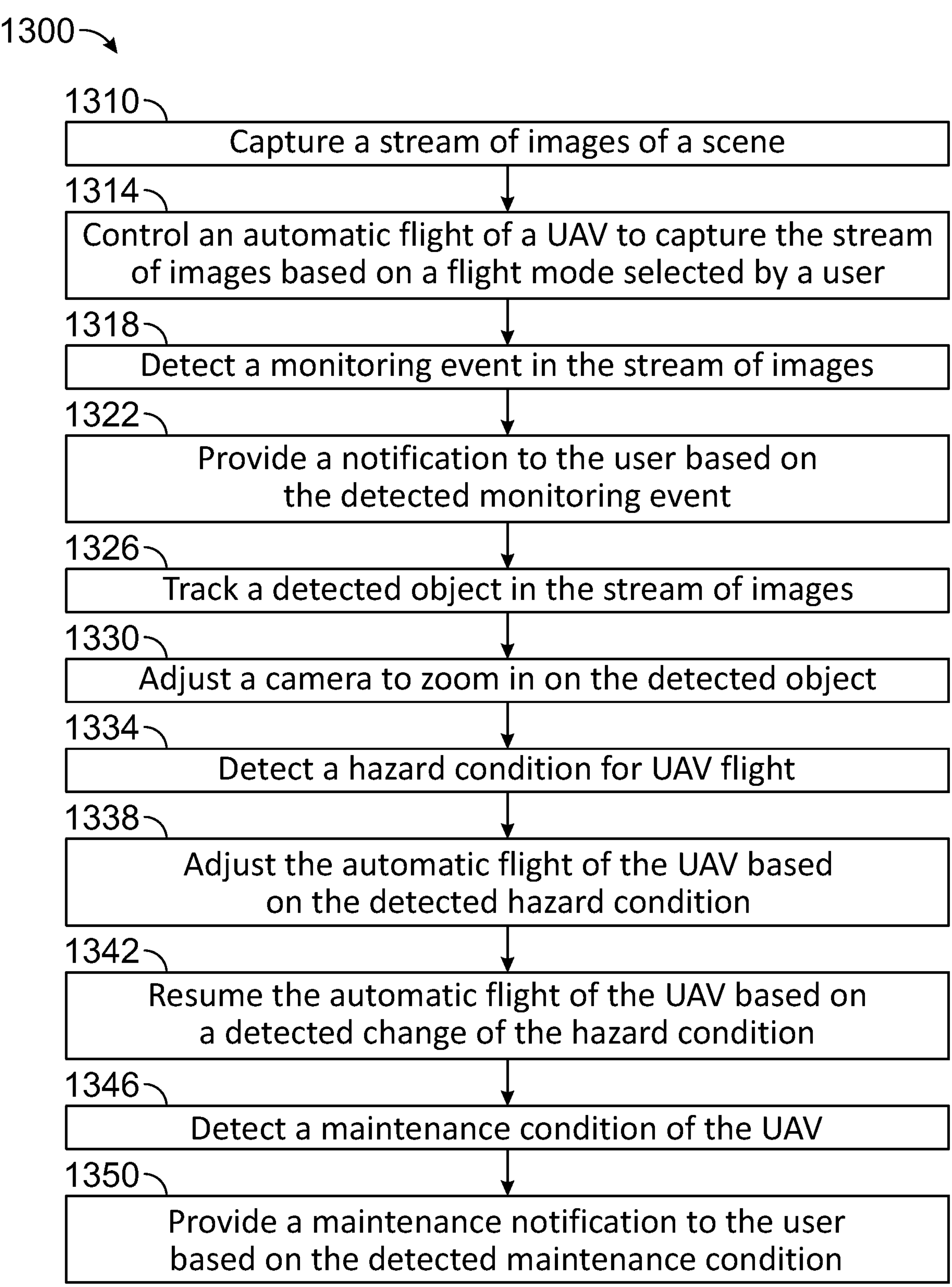
FIG. 13 illustrates a process of automatically scanning a scene using a UAV, in accordance with an embodiment of the disclosure.

FIG. 13 illustrates a process 1300 of automatically scanning scene 424 using UAV 110, in accordance with an embodiment of the disclosure. Although described with reference to UAV 110, process 1300 may be used in connection with a different UAV. In embodiments, process 1300 may be performed by controller 112 or any other controller or logic device of system 100, such as during runtime operations of system 100. In some embodiments, process 1300 may be performed by one or more logic devices, such as multiple logic devices distributed amongst various elements of a system (e.g., within UAV 110, within system 100, on a network, etc.). In embodiments, various operations of process 1300 may be performed by a first logic device, and other operations of process 1300 may be performed by a second logic device. Note that one or more operations of FIG. 13 may be combined, omitted, and/or performed in a different order as desired.

In block 1310, process 1300 includes capturing a stream of images of scene 424. For example, a stream of images may be captured by imaging system 128 and/or imaging system 141 of UAV 110. Depending on the application, the stream of images may be captured and processed on UAV 110 (e.g., by controller 112 or other logic device) or remote from UAV 110, such as on base station 130, a remote server, or the like.

In block 1314, process 1300 includes controlling an automatic flight of UAV 110 to capture the stream of images based on a flight mode selected by a user. In embodiments, block 1314 includes autonomously rotating UAV 110 between a first orientation angle of UAV 110 and a second orientation angle of UAV 110 relative to scene 424, such as between first bound 510 and second bound 512, as described above. The first and second orientation angles may be selected by the user. For instance, first bound 510 and second bound 512 may be set by dragging first dot 520 and second dot 522 of first user controls 500.

In embodiments, block 1314 includes autonomously rotating UAV 110 in a circle about a yaw axis. For example, UAV 110 may autonomously rotate in a circle based on settings selected in second user controls 600, as described above. In embodiments, block 1314 includes autonomously orienting UAV 110 towards one or more targets selected by the user. For instance, UAV 110 may autonomously scan the targets listed in target list 718, as described above. In embodiments, block 1314 includes adjusting a scanning speed of UAV 110 based on a speed selected by the user. For example, the scanning speed of UAV 110 may be adjusted based on user positioning of slider 538.

In block 1318, process 1300 includes detecting a monitoring event in the stream of images. In embodiments, block 1318 includes detecting an object in the stream of images. For example, a person or vehicle may be detected (e.g., by controller 112) in stream of images. In embodiments, motion may be detected in stream of images, such as motion of objects, foliage, clouds, etc.

In block 1322, process 1300 includes providing a notification to the user based on the detected monitoring event. In embodiments, the notification may be provided in a user interface, such as user interface 400 and/or user interface 1100, as described above. The notification may include a push notification, a dialog popover, a sound, and/or haptic feedback to the user, as described above. In embodiments, block 1322 includes providing captured media 912 of the monitoring event for review by the user, such as during the automatic flight of UAV 110. For example, the user may view the captured media 912 (e.g., in user interface 400 and/or user interface 1100) as UAV 110 continues its scanning behavior without interruption, as described above. In embodiments, a list of notifications may be provided in a user interface (e.g., user interface 400 and/or user interface 1100) for on-demand review by the user.

In block 1326, process 1300 includes tracking a detected object in the stream of images. Once an object is detected in the stream of images, system 100 may autonomously begin tracking the detected object. For example, imaging system 128 and/or imaging system 141 (or the UAV 110 itself) may follow the detected object. In such embodiments, UAV 110 may stop its scanning behavior of scene 424 to track the detected object. Additionally, or alternatively, the detected object may be tracked in the stream of images as UAV 110 continues scanning scene 424.

In block 1330, process 1300 includes adjusting a camera to zoom in on the detected object. For example, a zoom setting of imaging system 128 and/or imaging system 141 may be adjusted autonomously to provide a larger or clearer picture of the detected object, such as for event review by the user.

In block 1334, process 1300 includes detecting a hazard condition for UAV flight. For example, UAV 110 and/or system 100 may detect high winds or other environmental conditions hazardous to continued flight of UAV 110. In block 1338, process 1300 includes adjusting the automatic flight of UAV 110 based on the detected hazard condition. For instance, if the system detects high winds, UAV 110 may autonomously lower (e.g., by some amount of altitude) until the undesirable conditions clear. In block 1342, process 1300 includes resuming the automatic flight of UAV 110 based on a detected change of the hazard condition. For example, once the high winds clear, UAV 110 may autonomously return to its initial altitude. In this manner, blocks 1334, 1338, and 1342 may automate handling of common expected error conditions without user intervention. Of course, the user or pilot may override these behaviors at any point. In addition, the system may make best efforts not to interrupt the monitoring behaviors of UAV 110 while handling expected errors.

In block 1346, process 1300 includes detecting a maintenance condition of UAV 110. For example, UAV 110 may identify scheduled maintenance or flight errors requiring inspection. In block 1350, process 1300 includes providing a maintenance notification to the user based on the detected maintenance condition. For instance, the maintenance condition may be communicated to the user or pilot (e.g., via maintenance minder 1004), such as in a manner as described above. In embodiments, the maintenance condition may be acknowledged by the user or pilot.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:

an unmanned aerial vehicle (UAV) comprising a camera configured to capture a stream of images of a scene in performing a monitoring task to monitor objects, wherein performing the monitoring task comprises detecting, and notifying a user of, monitoring events pertaining to the objects;

a user interface device; and one or more logic devices configured, in performing the monitoring task, to:

control an automatic flight of the UAV to capture the stream of images based on an automatic flight mode selected by a user, detect a monitoring event in the stream of images, and provide a notification to the user based on the detected monitoring event to facilitate monitoring the objects, wherein the user interface device is configured to present a monitoring event interface to the user, the monitoring event interface being configured to allow the user to select one or more of a plurality of classes of monitoring events to be detected in the scene to monitor the objects, the one or more logic devices providing notifications for the selected one or more classes of monitoring events.

2. The system of claim 1, wherein the controlling the automatic flight of the UAV comprises rotating the UAV between a first orientation angle of the UAV and a second orientation angle of the UAV relative to the scene, wherein the first and second orientation angles are selected by the user;

wherein the plurality of classes include a people class, a vehicle class, and a motion class.

3. The system of claim 1, wherein the controlling the automatic flight of the UAV comprises:

rotating the UAV in a circle about a yaw axis;

orienting the UAV towards one or more targets selected by the user; and/or adjusting a scanning speed of the UAV based on a speed selected by the user.

4. The system of claim 1, wherein:

the monitoring event comprises a detection of an object in the stream of images; and the one or more logic devices are further configured to track the detected object in the stream of images and/or adjust the camera to zoom in on the detected object.

5. The system of claim 1, wherein the notification is associated with captured media of the monitoring event for review by the user during the automatic flight of the UAV.

6. The system of claim 1, wherein the one or more logic devices comprise:

a first logic device configured to control the automatic flight of the UAV; and a second logic device configured to detect the monitoring event in the stream of images.

7. The system of claim 1, wherein the one or more logic devices comprise a logic device configured to control the automatic flight of the UAV and detect the monitoring event in the stream of images.

8. The system of claim 1, wherein the UAV comprises at least one of the logic devices.

9. A system comprising:

an unmanned aerial vehicle (UAV) comprising a camera configured to capture a stream of images of a scene in performing a monitoring task to monitor objects, wherein performing the monitoring task comprises detecting, and notifying a user of, monitoring events pertaining to the objects;

a user interface device; and one or more logic devices configured, in performing the monitoring task, to:

control an automatic flight of the UAV to capture the stream of images based on an automatic flight mode selected by a user, detect a monitoring event in the stream of images, and provide a notification to the user based on the detected monitoring event to facilitate monitoring the objects, detect an environmental hazard condition for UAV flight;

adjust the automatic flight of the UAV based on the detected hazard condition; and resume the automatic flight of the UAV based on a detected change of the hazard condition.

10. The system of claim 9, wherein:

the hazard condition includes a high wind condition;

adjusting the automatic flight includes lowering the UAV; and the one or more logic devices are further configured to:

detect a maintenance condition of the UAV; and provide a maintenance notification to the user based on the detected maintenance condition.

11. A method comprising performing a monitoring task to monitor objects, wherein performing the monitoring task comprises:

presenting to a user, by a user interface device, a monitoring event interface, the monitoring event interface allowing the user to select one or more of a plurality of classes of monitoring events to be detected in the scene to monitor the objects, the user being to be notified of the selected one or more classes;

capturing, using a camera of an unmanned aerial vehicle (UAV), a stream of images of a scene;

controlling, by one or more logic devices, an automatic flight of the UAV to capture the stream of images based on an automatic flight mode selected by a user;

detecting, by the one or more logic devices, a monitoring event in the stream of images, the monitoring event being in at least one of the one or more classes selected by the user; and providing, by the one or more logic devices, a notification to the user based on the detected monitoring event.

12. The method of claim 11, wherein the controlling the automatic flight of the UAV comprises rotating the UAV between a first orientation angle of the UAV and a second orientation angle of the UAV relative to the scene, wherein the first and second orientation angles are selected by the user.

13. The method of claim 11, wherein the controlling the automatic flight of the UAV comprises:

rotating the UAV in a circle about a yaw axis;

orienting the UAV towards one or more targets selected by the user; and/or adjusting a scanning speed of the UAV based on a speed selected by the user; and wherein the plurality of classes include a people class, a vehicle class, and a motion class.

14. The method of claim 11, wherein the monitoring event comprises a detection of an object in the stream of images; and the method further comprises tracking by the one or more logic devices the detected object in the stream of images and/or adjusting by the one or more logic devices the camera to zoom in on the detected object.

15. The method of claim 11, wherein the notification is associated with captured media of the monitoring event for review by the user during the automatic flight of the UAV.

16. The method of claim 11, further comprising:

detecting, by the one or more logic devices, a hazard condition for UAV flight;

adjusting, by the one or more logic devices, the automatic flight of the UAV based on the detected hazard condition; and resuming, by the one or more logic devices, the automatic flight of the UAV based on a detected change of the hazard condition;

wherein the hazard condition includes a high wind condition; and adjusting the automatic flight includes lowering the UAV.

17. The method of claim 11, further comprising:

detecting, by the one or more logic devices, a maintenance condition of the UAV; and providing, by the one or more logic devices, a maintenance notification to the user based on the detected maintenance condition.

18. The method of claim 11, wherein the one or more logic devices comprise:

a first logic device configured to control the automatic flight of the UAV; and a second logic device configured to detect the monitoring event in the stream of images.

19. The method of claim 11, wherein the one or more logic devices comprise a logic device configured to control the automatic flight of the UAV and detect the monitoring event in the stream of images.

20. The method of claim 11, wherein the UAV comprises at least one of the logic devices.

* * * * *